US012731304B2

(12) United States Patent
Tsuda et al.

(10) Patent No.: US 12,731,304 B2
(45) Date of Patent: Sep. 8, 2026

(54) DISPLAY CONTROL DEVICE, METHOD, AND STORAGE MEDIUM

(71) Applicant: TOYOTA JIDOSHA KABUSHIKI KAISHA, Toyota (JP)

(72) Inventors: Hideki Tsuda, Nagoya (JP); Kazuhisa Ishimaru, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 18/758,803

(22) Filed: Jun. 28, 2024

(65) Prior Publication Data

US 2026/0057576 A1 Feb. 26, 2026

(30) Foreign Application Priority Data

Jul. 3, 2023 (JP) ................................ 2023-109652

(51) Int. Cl.
*G06T 11/23* (2026.01)
*G06T 11/10* (2026.01)
*G06V 20/58* (2022.01)

(52) U.S. Cl.
CPC .............. *G06T 11/23* (2026.01); *G06T 11/10* (2026.01); *G06V 20/58* (2022.01); *G06V 2201/08* (2022.01)

(58) Field of Classification Search
CPC ..... G06T 11/203; G06T 11/001; G06V 20/58; G06V 2201/08
See application file for complete search history.

(56) References Cited

U.S. PATENT DOCUMENTS

2014/0232538 A1* 8/2014 Sobue .................... G06V 20/58 340/435
2016/0052394 A1* 2/2016 Yamada ................ B60W 50/14 701/93
2016/0159280 A1 6/2016 Takazawa et al.
2019/0317600 A1* 10/2019 White ................ G01C 21/3647
2019/0337454 A1 11/2019 Takazawa et al.
2020/0391593 A1* 12/2020 Lee ........................ B60K 35/60
2021/0245749 A1* 8/2021 Ross ................... B60W 30/165
2023/0204373 A1* 6/2023 Lee ...................... G01C 21/365 701/436
2024/0183680 A1* 6/2024 Teraguchi ............. G01C 21/36

FOREIGN PATENT DOCUMENTS

JP 2015-011666 A 1/2015

* cited by examiner

*Primary Examiner* — Jitesh Patel
(74) *Attorney, Agent, or Firm* — Dinsmore & Shohl LLP

(57) ABSTRACT

A display control device includes a display control section that is configured to: perform first display in cases in which a display position of a following mark corresponding to a lead vehicle detected by a lead vehicle detection section for detecting lead vehicles is within a set display region set in advance in a display area of a display device by displaying the following mark at the display position; and perform second display to indicate that the lead vehicle is being detected in cases in which the display position falls outside the set display region.

7 Claims, 8 Drawing Sheets

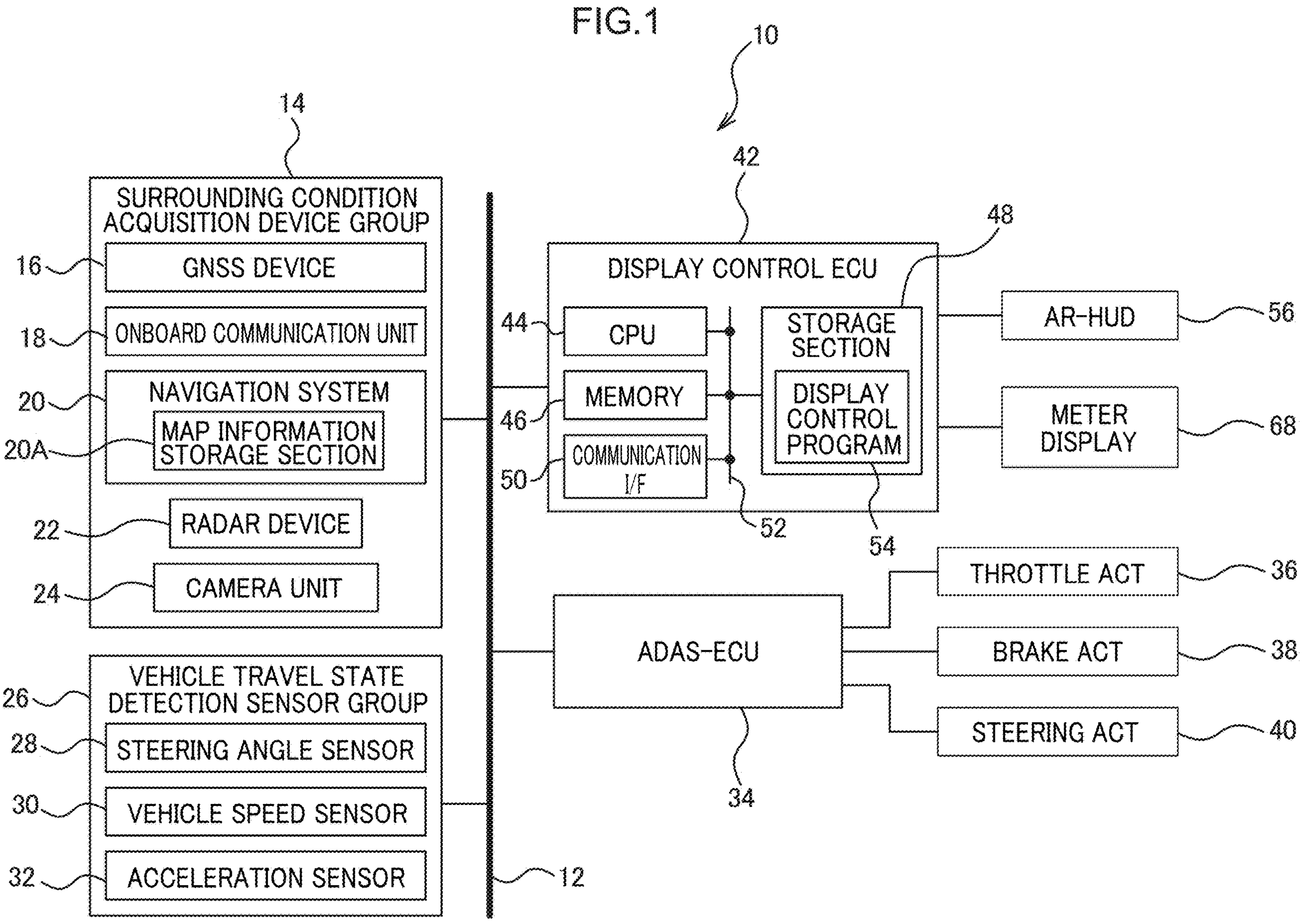
FIG.1
10
14
SURROUNDING CONDITION ACQUISITION DEVICE GROUP
16
GNSS DEVICE
18
ONBOARD COMMUNICATION UNIT
20
NAVIGATION SYSTEM
20A
MAP INFORMATION STORAGE SECTION
22
RADAR DEVICE
24
CAMERA UNIT
26
VEHICLE TRAVEL STATE DETECTION SENSOR GROUP
28
STEERING ANGLE SENSOR
30
VEHICLE SPEED SENSOR
32
ACCELERATION SENSOR
12
42
DISPLAY CONTROL ECU
44
CPU
46
MEMORY
50
COMMUNICATION I/F
52
48
STORAGE SECTION
DISPLAY CONTROL PROGRAM
54
AR-HUD
56
METER DISPLAY
68
ADAS-ECU
34
THROTTLE ACT
36
BRAKE ACT
38
STEERING ACT
40

FIG.4

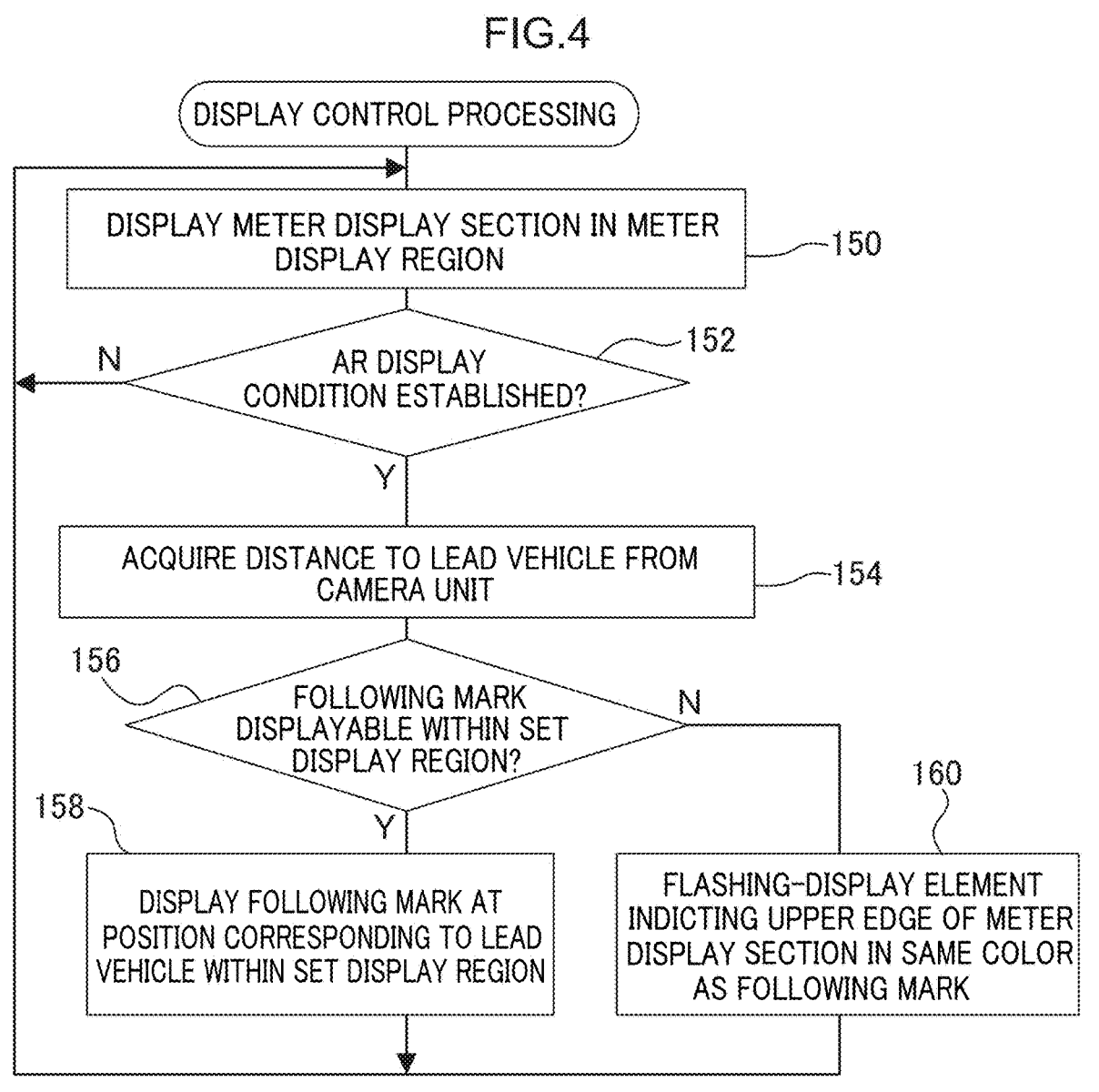

DISPLAY CONTROL PROCESSING

150: DISPLAY METER DISPLAY SECTION IN METER DISPLAY REGION

152: AR DISPLAY CONDITION ESTABLISHED? (N: return; Y: next)

154: ACQUIRE DISTANCE TO LEAD VEHICLE FROM CAMERA UNIT

156: FOLLOWING MARK DISPLAYABLE WITHIN SET DISPLAY REGION? (Y: 158; N: 160)

158: DISPLAY FOLLOWING MARK AT POSITION CORRESPONDING TO LEAD VEHICLE WITHIN SET DISPLAY REGION

160: FLASHING-DISPLAY ELEMENT INDICTING UPPER EDGE OF METER DISPLAY SECTION IN SAME COLOR AS FOLLOWING MARK

FIG.5

74
78
90
92
M 15 144 MHP100
82
84
80
76

78
74(94)
90
M15
144
MHP 100
82
84
80

DISPLAY CONTROL DEVICE, METHOD, AND STORAGE MEDIUM

CROSS-REFERENCE TO RELATED APPLICATION

This application is based on and claims priority under 35 USC 119 from Japanese Patent Application No. 2023-109652 filed on Jul. 3, 2023, the disclosure of which is incorporated by reference herein.

BACKGROUND

Technical Field

The present disclosure relates to a display control device, a display control method, a program product, and a non-transitory storage medium stored with a display control program.

Related Art

In technology described in Japanese Patent Application Laid-Open (JP-A) No. 2015-011666, the brightness of a guide image (i.e., a following mark) for overlay displayed on a display subject object is gradually reduced or changed to a simplified image smaller than the guide image in cases in which the position of the display subject object as seen by a driver moves outside a set display region that is set in advance within a display area of a head-up display (HUD).

For example, in cases in which a lead vehicle is positioned in a region unable to display a following mark (or guide image) due to a distance between an ego vehicle and a lead vehicle being too near or the like, when nothing is displayed on a display device this means that a user is unable to ascertain whether or not a lead vehicle is being detected even though a lead vehicle detection section for detecting lead vehicles has been able to detect a lead vehicle, with this leading to the possibility that a feeling of insecurity is imparted to a user.

SUMMARY

In consideration of the above circumstances, the present disclosure provides a display control device, a display control method, a program product, and a non-transitory storage medium stored with a display control program that are capable of suppressing a feeling of insecurity being imparted to a user when a following mark is unable to be displayed on a display device.

A display control device according to a first aspect includes a display control section that performs first display in cases in which a display position of a following mark corresponding to a lead vehicle detected by a lead vehicle detection section for detecting lead vehicles is within a set display region set in advance in a display area of a display device by displaying the following mark at the display position, and that performs second display to indicate that the lead vehicle is being detected in cases in which the display position falls outside the set display region.

In the first aspect, the first display is performed when the display position of the following mark corresponding to the lead vehicle is within the set display region set in advance in the display area of the display device by displaying the following mark at the display position of the following mark. On the other hand the second display to indicate that a lead vehicle is being detected is performed when the display position of the following mark falls outside the set display region. Thus through the second display a user is able to be made aware that a lead vehicle is being detected, enabling an feeling of insecurity to be suppressed from being imparted to a user when the following mark is unable to be displayed on the display device.

A second aspect is the first aspect, wherein the display position of the following mark is a position either overlapping with or adjacent to the lead vehicle.

The second aspect enables a user to be made more intuitively aware that the following mark is a mark corresponding to the lead vehicle than cases in which the following mark is displayed at a position separated by a gap to the lead vehicle.

A third aspect is the first aspect, wherein the set display region is a region resulting from removal from the display area of a meter display region where at least a meter display section is displayed at a lower side of the display area in a vehicle height direction.

In the third aspect, the following mark is not displayed in the meter display region at the lower side of the display area in the vehicle height direction, and so this enables the visibility of the meter display section or the like displayed in the meter display region to be prevented from being obstructed by the following mark.

A fourth aspect is the first aspect, wherein as the second display the display control section performs display to change display outside the set display region.

The fourth aspect enables display within the set display region to be suppressed from becoming complicated accompanying performing the second display.

The fifth aspect is the first aspect, wherein as the second display the display control section performs display to emphasize-display a meter display section displayed outside the set display region.

In the fifth aspect, emphasize-display of the pre-existing meter display section enables a user to be made aware that a lead vehicle is being detected while avoiding display in a range outside the set display region from becoming complicated.

A sixth aspect is the first aspect, wherein as the second display the display control section performs display to emphasize-display an element of a meter display section indicating an upper edge of the meter display section displayed outside the set display region.

In the sixth aspect, emphasize-display of the element indicating the upper edge of the pre-existing meter display section enables a user to be made aware that a lead vehicle is being detected while avoiding display in a range outside the set display region from becoming complicated.

A seventh aspect is the first aspect, wherein as the second display the display control section performs display to emphasize-display a frame indicating an outer edge of the display area.

The seventh aspect enables a user to be made aware that a lead vehicle is being detected while avoiding display within the display area from becoming complicated.

An eighth aspect is the first aspect, wherein as the second display the display control section performs display to display a specific icon indicating that the lead vehicle is being detected by display outside the set display region.

The eighth aspect enables a user to be intuitively made aware that a lead vehicle is being detected.

A ninth aspect is any one of the fifth aspect to the eighth aspect, wherein the display control section displays a subject to be displayed as the second display by display in a same color as the following mark.

The ninth aspect enables a user to be intuitively made aware that a subject being displayed as the second display indicates that a lead vehicle is being detected. Moreover, when the display position of the following mark corresponding to the lead vehicle has returned from outside the set display region to within the set display region, the following mark is displayed in the same color as the subject being displayed as the second display, resulting in a seamless representation and suppressing an unsettling feeling from being imparted to the user.

A tenth aspect is any one of the fifth aspect to the eighth aspect, wherein the display control section displays a subject to be displayed as the second display by flashing-display.

The tenth aspect enables the subject to be displayed as the second display to be made to stand out more, thereby enabling improved visibility of the subject to be displayed as the second display.

An eleventh aspect is the first aspect, wherein the display device is a head-up display.

The eleventh aspect enables a feeling of insecurity to be suppressed from being imparted to a user in cases in which the following mark is unable to be displayed on the head-up display.

A twelfth aspect is a display control method that is performed by a computer. The method includes performing first display in cases in which a display position of a following mark corresponding to a lead vehicle detected by a lead vehicle detection section for detecting lead vehicles is within a set display region set in advance in a display area of a display device by displaying the following mark at the display position, and performing second display to indicate that the lead vehicle is being detected in cases in which the display position falls outside the set display region.

The twelfth aspect, similarly to the first aspect, enables a feeling of insecurity to be suppressed from being imparted to a user in cases in which the following mark is unable to be displayed on the display device.

A thirteenth aspect is a non-transitory storage medium storing a program that causes a computer to execute display control processing. The display control processing includes performing first display in cases in which a display position of a following mark corresponding to a lead vehicle detected by a lead vehicle detection section for detecting lead vehicles is within a set display region set in advance in a display area of a display device by displaying the following mark at the display position, and performing second display to indicate that the lead vehicle is being detected in cases in which the display position falls outside the set display region.

The thirteenth aspect, similarly to the first aspect, enables a feeling of insecurity to be suppressed from being imparted to a user in cases in which the following mark is unable to be displayed on the display device.

A fourteenth aspect is a program product including a program that causes a computer to execute display control processing, the display control processing including: performing first display in cases in which a display position of a following mark corresponding to a lead vehicle detected by a lead vehicle detection section for detecting lead vehicles is within a set display region set in advance in a display area of a display device by displaying the following mark at the display position; and performing second display to indicate that the lead vehicle is being detected in cases in which the display position falls outside the set display region.

The present disclosure enables a feeling of insecurity to be suppressed from being imparted to a user in cases in which the following mark is unable to be displayed on the display device.

BRIEF DESCRIPTION OF THE DRAWINGS

Exemplary embodiments of the present disclosure will be described in detail based on the following figures, wherein:

FIG. 1 is a block diagram illustrating a schematic configuration of an onboard system according to an exemplary embodiment;

FIG. 4 is a flowchart illustrating display control processing executed by a display control ECU;

FIG. 5 is a concept diagram illustrating an example of a display on an AR-HUD;

DETAILED DESCRIPTION

Figure 2:
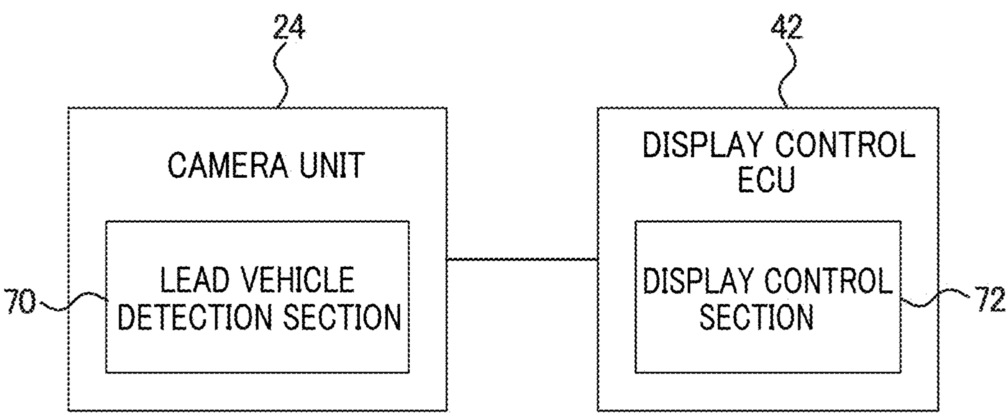
FIG. 2 is a functional block diagram of a camera unit and a display control ECU.

Detailed explanation follows regarding an example of an exemplary embodiment of the present disclosure, with reference to the drawings. As illustrated in FIG. 1, an onboard system 10 according to the present exemplary embodiment includes a communication bus 12, with a surrounding condition acquisition device group 14, a vehicle travel state detection sensor group 26, an advance driver-assistance system (ADAS)-electronic control unit (ECU) 34, and a display control ECU 42 each connected to the communication bus 12. Note that only part of the onboard system 10 is illustrated in FIG. 1. A vehicle installed with the onboard system 10 will be referred to below as the ego vehicle.

The surrounding condition acquisition device group 14 includes, as devices to acquire information expressing conditions such what the environment around the ego vehicle is like, a global navigation satellite system (GNSS) device 16, an onboard communication unit 18, a navigation system 20, a radar device 22, and a camera unit 24.

The GNSS device 16 measures the position of the ego vehicle by receiving GNSS signals from plural GNSS satellites. The onboard communication unit 18 is a communication device that performs at least one out of vehicle-to-vehicle communication with other vehicles or road-to-vehicle communication with roadside infrastructure. The navigation system 20 includes a map information storage section 20A that stores map information, and performs processing to display the position of the ego vehicle on a map and to decide a route to a destination and guide the ego vehicle there based on the position information obtained from the GNSS device 16 and the map information stored in the map information storage section 20A.

The radar device 22 detects objects such as pedestrians and other vehicles present in the surroundings of the ego vehicle as point cloud information and also acquires relative positions and relative speeds of such detected objects with respect to the ego vehicle. The radar device 22 also removes noise and roadside objects such as guardrails from monitoring subjects based on changes in the relative positions and relative speeds of the respective objects, and outputs information about the relative positions and relative speeds and the like to the monitoring subject objects such as the pedestrians, other vehicles, and the like.

The camera unit 24 images the surroundings of the ego vehicle using plural cameras, and outputs the acquired images. Moreover, although not illustrated in the drawings, the camera unit 24 includes an in-built central processing unit (CPU), read only memory (ROM), random access memory (RAM), and the like, and a non-volatile (or non-transitory) storage section such as a hard disk drive (HDD), solid state drive (SSD), or the like. The storage section is stored with a specific program to cause the CPU of the camera unit 24 to function as a lead vehicle detection section 70 (see FIG. 2). From images of in front of the ego vehicle as captured by the plural cameras, the lead vehicle detection section 70 recognizes a lead vehicle to the ego vehicle as captured in these images, and detects and outputs a distance between the ego vehicle and the lead vehicle. Moreover, the lead vehicle detection section 70 also detects and outputs a distance as computed by combining a depth to the lead vehicle from the radar device 22 and the position of the lead vehicle as detected by the cameras.

The vehicle travel state detection sensor group 26 includes, as plural sensors for acquiring a travel state of the vehicle, a steering angle sensor 28 that detects the steering angle of the ego vehicle, a vehicle speed sensor 30 that detects the travel speed of the ego vehicle, and an acceleration sensor 32 that detects a rate of acceleration acting on the ego vehicle.

A throttle actuator (ACT) 36 that changes the throttle position of the ego vehicle, a brake actuator (ACT) 38 that changes braking force generated by a braking device of the ego vehicle, and a steering actuator (ACT) 40 that changes a steering amount of a steering device of the ego vehicle are also connected to the ADAS-ECU 34.

The ADAS-ECU 34 includes a CPU, memory such as ROM or RAM, a non-volatile (or non-transitory) storage section such as a hard disk drive (HDD), solid state drive (SSD), or the like, and a communication interface (I/F). ADAS software is stored in the storage section. The ADAS-ECU 34 performs autonomous driving processing to cause the ego vehicle to travel autonomously without driving operations by an occupant of the ego vehicle by the CPU executing autonomous driving software when an autonomous driving mode has been selected.

The autonomous driving processing is processing to determine a condition of the ego vehicle and its surroundings based in the information obtained from the surrounding condition acquisition device group 14 and the vehicle travel state detection sensor group 26, and is processing to control the throttle ACT 36, the brake ACT 38, and the steering ACT 40. An example of the autonomous driving processing is adaptive cruise control (ACC) that causes the ego vehicle to travel so as to follow a lead vehicle recognized by the camera unit 24.

The display control ECU 42 includes a CPU 44, memory 46 such as ROM or RAM, a non-transitory storage section 48 such as a hard disk drive (HDD), solid state drive (SSD), or the like, and a communication I/F 50. The CPU 44, the memory 46, the storage section 48, and the communication I/F 50 are connected together through an internal bus 52 so as to be capable of communicating with each other. A display control program 54 is stored in the storage section 48. The display control ECU 42 reads the display control program 54 from the storage section 48, loads the display control program 54 on the memory 46, and the display control ECU 42 functions as a display control section 72 as illustrated in FIG. 2, and performs display control processing as described later, by the display control program 54 loaded on the memory 46 being executed by the CPU 44.

The display control ECU 42 is connected to an augmented reality (AR)-head-up display (hereafter referred to as an AR-HUD) 56 and to a meter display 68. The AR-HUD 56 according to the present exemplary embodiment is a compact HUD that operates such as by reflection onto a windshield glass so as to display a display area indicated by reference numeral 74 in FIG. 5 as a display area that is part of the field of view in front of a user, i.e. an occupant of the ego vehicle (forms an image at the bottom of a scene ahead). The meter display 68 is a display provided to an instrument panel of the ego vehicle. The display control ECU 42 controls information display on the AR-HUD 56 and on the meter display 68.

Figure 3:
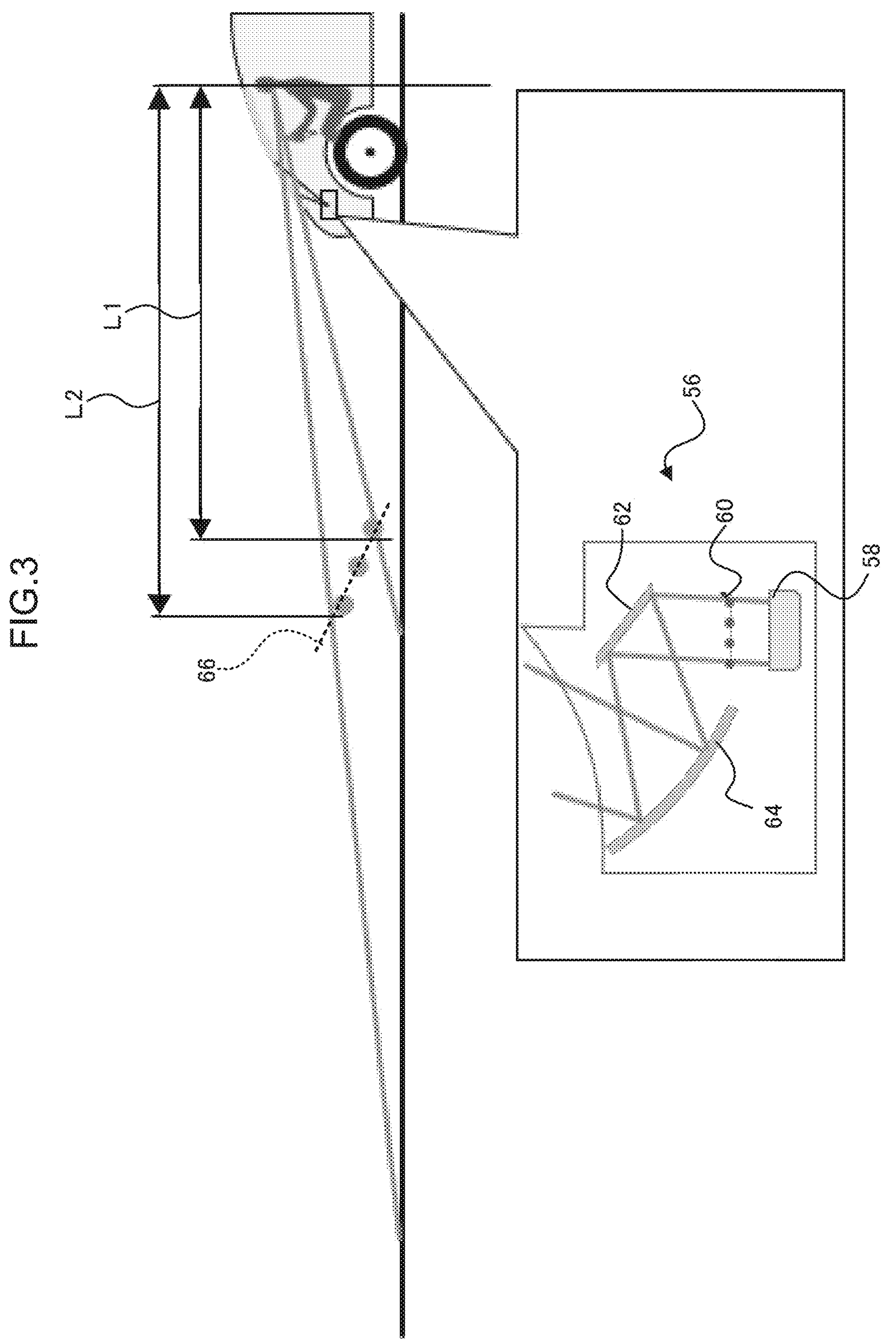
FIG. 3 is an explanatory diagram illustrating a schematic configuration of an AR-HUD.

As illustrated in FIG. 3, the AR-HUD 56 includes a light source section 58 configured from light emitting diodes (LEDs) or the like, and a transmission type display section 60 configured from a liquid crystal display (LCD) or the like that has been disposed at the light emission side of the light source section 58. A convex mirror 62 and a concave mirror 64 are disposed in sequence at the light emission side of the display section 60, and light transmitted through the display section 60 is reflected in sequence by the convex mirror 62 and the concave mirror 64 and illuminated onto the windshield of the vehicle. The AR-HUD 56 has an optical system designed such that an image displayed on the display section 60 (hereafter referred to as a following mark or the like) is formed at a virtual image plane 66 inclined with respect to the vehicle height direction and floating in space at a distance of from L1 to L2 from the user. This thereby enables a user to experience an illusion as if the image formed at the virtual image plane 66 is superimposed on the road surface.

In the AR-HUD 56, in cases in which the lead vehicle to the ego vehicle is present at a distance from the ego vehicle in a range of 0 m to $L1+\alpha$, the display position of the following mark corresponding to the lead vehicle falls outside from a set display region 78, described later, and the following mark is not able to be displayed within the set display region 78. Note that $\alpha$ is an incremental amount of the display control distance at which the following mark is unable to be displayed in a meter display region 76.

Note that the display control ECU 42 serves as an example of a display control device according to the present disclosure, and the display control program 54 serves as an example of a display control program according to the present disclosure. The AR-HUD 56 serves as an example of a display device.

Next, description follows regarding display control processing executed as an operation of the present exemplary embodiment by the display control ECU 42 (the display control section 72) while the ignition switch of the ego vehicle is switched ON, with reference to FIG. 4.

Figure 5:
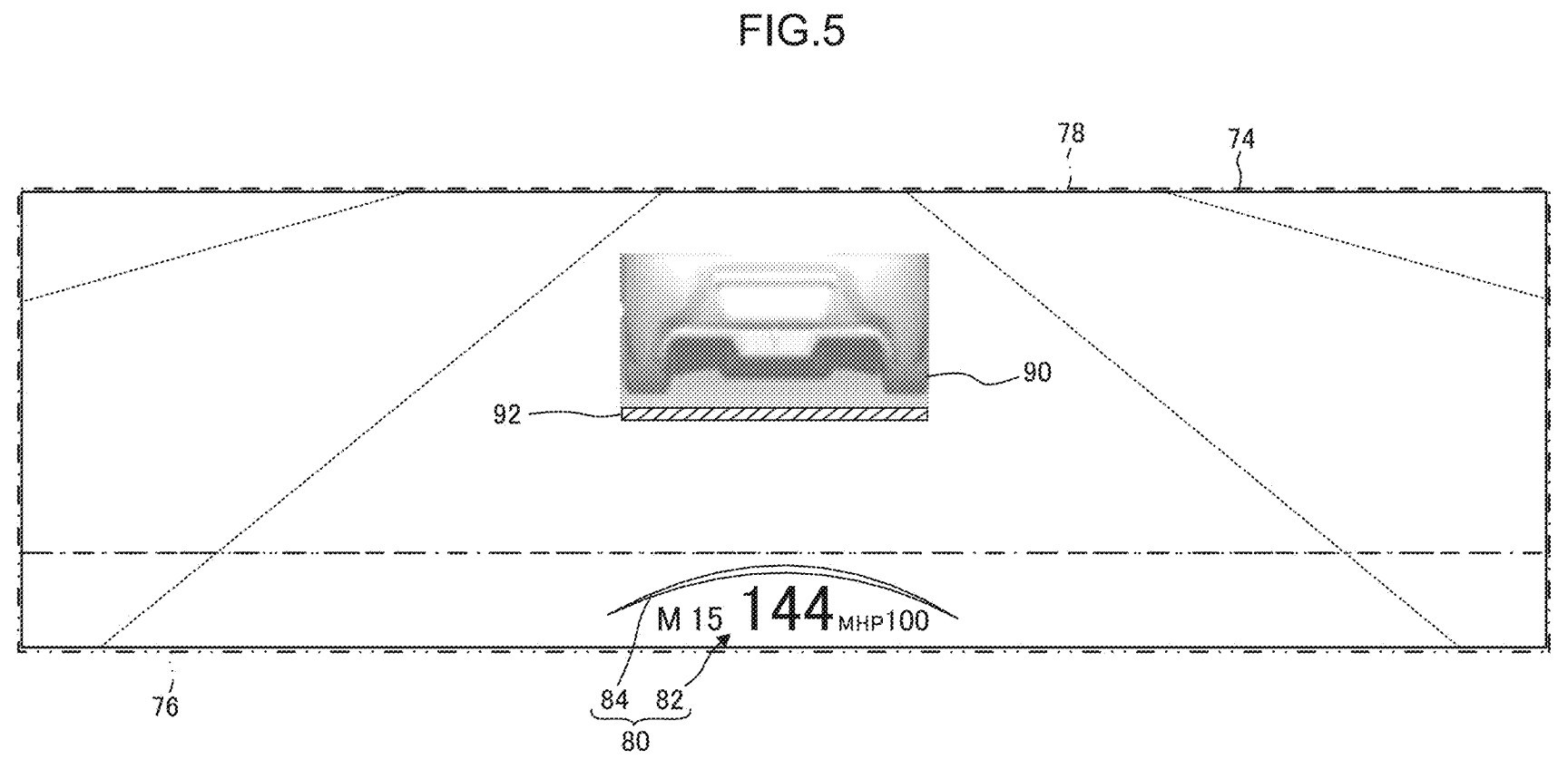

At step 150 of the display control processing, the display control section 72 controls the AR-HUD 56 so as to display a meter display section 80 or the like in the meter display region 76 positioned on the lower side of a display area 74 of the AR-HUD 56 in the vehicle height direction, as illustrated in an example in FIG. 5. As illustrated in FIG. 5, the meter display section 80 includes a character display section 82 to display characters such as the speed of the ego vehicle, and an element 84 indicating an upper edge of the meter display section 80. The element 84 is normally displayed in white.

Note that the information displayed in the meter display region 76 is not limited to the meter display section 80, and switching a display mode of the AR-HUD 56 enables, for example, information such as a mark indicating that overtaking is forbidden, characters indicting a speed limit, or the like to be displayed thereon. Moreover, a region (a region indicated by being appended with the reference numeral 78 in FIG. 5) resulting from excluding the meter display region 76 from the display area 74 of the AR-HUD 56 serves as an example of a set display region of the present disclosure, hereafter referred to as set display region 78.

At step 152, the display control section 72 determines whether or not an AR display condition has been established. In the present exemplary embodiment the display control section 72 determines that the AR display condition has been established when the ADAS-ECU 34 is executing ACC. Negative determination is made at step 152 when the ADAS-ECU 34 is not executing ACC and processing returns to step 150. Moreover, affirmative determination is made at step 152 when the ADAS-ECU 34 is executing ACC and processing transitions to step 154.

At step S154, the display control section 72 acquires from the lead vehicle detection section 70 (the camera unit 24) a distance L to the lead vehicle serving as a subject for the ego vehicle to follow under ACC performed by the ADAS-ECU 34. Then at step 156, based on the acquired distance L to the lead vehicle the display control section 72 determines whether or not a following mark 92 is able to be displayed within the set display region 78 so as to be displayed adjacent to an image 90 of the lead vehicle as seen by a user through the windshield, as illustrated in FIG. 5.

Note that the display control section 72 acquires the distance L to the lead vehicle from the camera unit 24, converts the acquired distance L to the lead vehicle into a depression angle $\varphi$ of the AR-HUD 56, and recognizes a display position of the following mark 92 on the AR-HUD 56 from the converted depression angle $\varphi$. Accordingly the determination by the display control section 72 at step 156 may be performed by comparing the distance L to the lead vehicle against a threshold $L_{th}$, and determining whether or not $L>L_{th}$, or may be performed by comparing the depression angle $\varphi$ against a threshold $\varphi_{th}$, and determining whether or not $\varphi<\varphi_{th}$.

Affirmative determination is made at step 156 when the following mark 92 is able to be displayed within the set display region 78, and processing transitions to step 158. At step 158 the display control section 72 displays the following mark 92 at the position (adjacent position) corresponding to the image 90 of the lead vehicle within the set display region 78 as illustrated in FIG. 5, and then processing returns to step 150. Note that examples of a display color of the following mark 92 are pale blue or green. Displaying the following mark 92 at the position corresponding to the lead vehicle image 90 enables the user to be made aware that the lead vehicle is being detected normally.

The display (display illustrated in FIG. 5) at step 158 is an example of a first display of the present disclosure. Moreover, although the example of FIG. 5 is a mode in which the following mark 92 is displayed at a position adjacent to the lead vehicle image 90, the following mark 92 may be displayed at a position partly overlapping with the lead vehicle image 90 (an overlapping position), or may be displayed at a position separated by a gap from the lead vehicle image 90.

Figure 6:
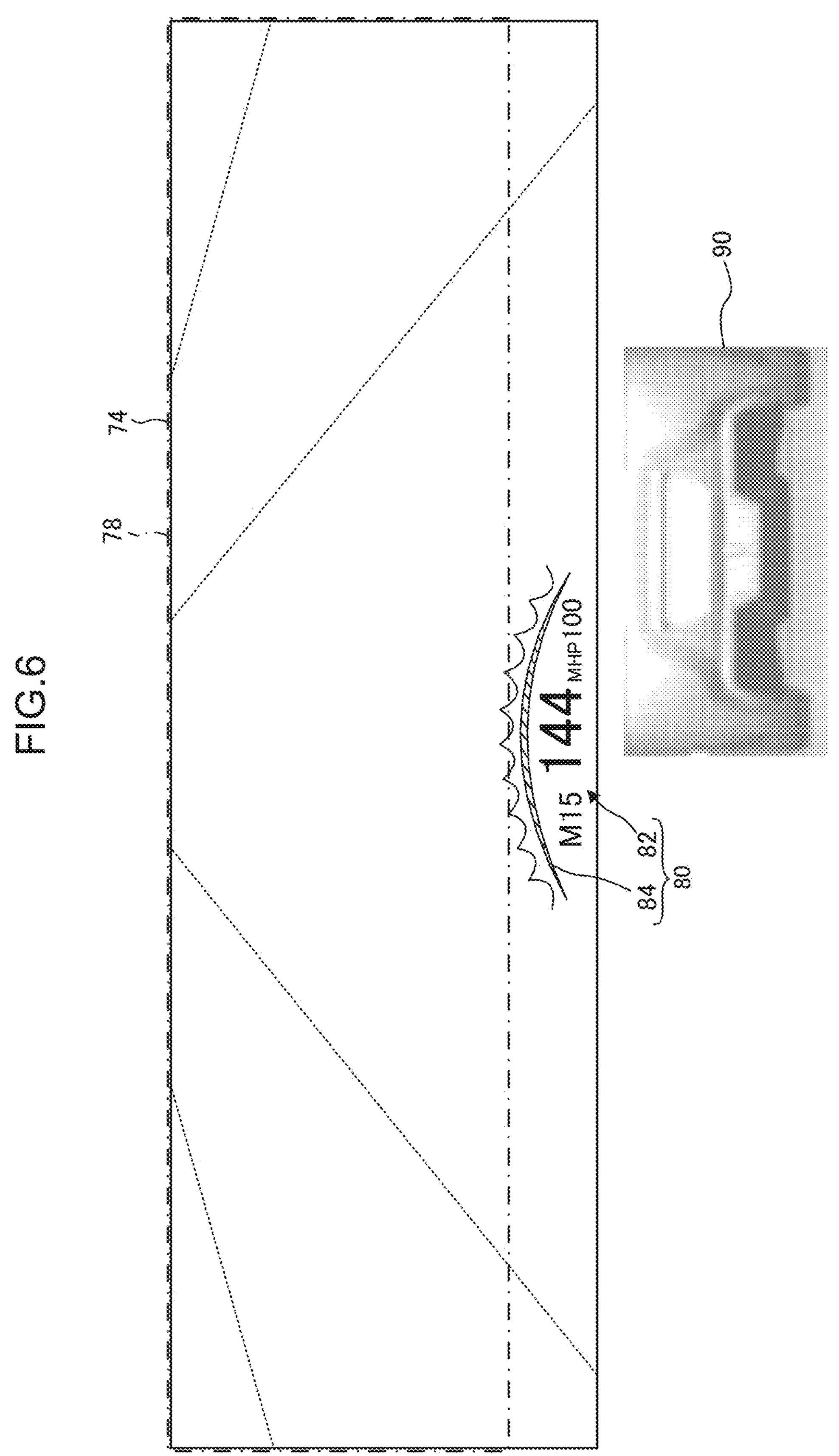
FIG. 6 is a concept diagram illustrating an example of a display on an AR-HUD.

Negative determination is made at step 156 and processing transitions to step 160 in cases in which the display position of the following mark 92 has fallen outside the set display region 78 due to the distance to the lead vehicle becoming close, i.e. due to distance L to the lead vehicle becoming $\leq L_{th}$ (or the depression angle $\varphi$ becoming $\geq\varphi_{th}$). Also negative determination is made at step 156 and processing transitions to step 160 in cases in which a vehicle traveling in a lane adjacent to the lane of travel of the ego vehicle has suddenly cut in front of the ego vehicle. At step 160, instead of displaying the following mark 92 the display control section 72 flashing-displays the element 84 indicating the upper edge of the meter display section 80 in the same color as the following mark 92, as illustrated in FIG. 6, and then processing returns to step 150. Note that reference here to the same color as the following mark 92 includes a color that differs from the display color of the following mark 92, but only differs therefrom within a specific value in any one or more dimension from out of hue, brightness, or saturation.

By flashing-displaying the element 84 of the meter display section 80 in the same color as the following mark 92 in this manner, the user can be made aware that a lead vehicle is being detected even in cases in which the following mark 92 is unable to be displayed, thereby suppressing the user from being imparted with a feeling of insecurity. Note that the display at step 160 (display as illustrated in FIG. 6) is an example of a second display of the present disclosure.

Affirmative determination is also made at step 156 and processing transitions to step 158 when the display position of the following mark 92 corresponding to the lead vehicle image 90 has returned from falling outside the set display region 78 to being within the set display region 78 due to the distance to the lead vehicle increasing and the distance L to the lead vehicle becoming $>L_{th}$ (or depression angle $\varphi$ becoming $<\varphi_{th}$). Displaying the following mark 92 within the set display region 78 in the same color as the element 84 of the meter display section 80 accordingly results in a seamless representation and suppresses an unsettling feeling from being imparted to the user.

As described above, the display control ECU 42 according to the present exemplary embodiment includes the display control section 72 that performs first display to display the following mark 92 corresponding to the image 90 of the lead vehicle detected by the lead vehicle detection section 70 for detecting lead vehicles at the display position of the following mark 92 when the display position of the following mark 92 is within the set display region 78 as set in advance in the display area 74 of the AR-HUD 56, and that performs second display to indicate that the lead vehicle is being detected when the display position of the following mark 92 is outside the set display region 78. This thereby enables a user to be made aware from the second display that the lead vehicle is being detected, enabling a feeling of insecurity to be suppressed from being imparted to a user when the following mark 92 is unable to be displayed on the AR-HUD 56.

Moreover, in the present exemplary embodiment the display position of the following mark 92 is a position either overlapping with or adjacent to the lead vehicle image 90. This means that a user is able to be made more intuitively aware that the following mark 92 is a mark corresponding to the lead vehicle image 90 than cases in which the following mark 92 is displayed at a position separated by a gap from the lead vehicle image 90.

Moreover, in the present exemplary embodiment the set display region 78 is a region in which at least the meter display section 80 is displayed, and is a region resulting from removing the meter display region 76 at the lower side of the display area 74 in the vehicle height direction from the display area 74. The following mark 92 is according not displayed in the meter display region 76 at the lower side of the display area 74 in the vehicle height direction, enabling visibility of the meter display section 80 or the like displayed in the meter display region 76 to be prevented from being obstructed by the following mark 92.

Moreover, in the present exemplary embodiment the display control section 72 performs display to change so as to display outside the set display region 78 as the second display. This enables display within the set display region 78 to be suppressed from becoming complicated as the second display is being performed.

Moreover in the present exemplary embodiment, as the second display the display control section 72 performs display to emphasize-display the element 84 indicating the upper edge of the meter display section 80 in the meter display section 80 that is displayed outside the set display region 78. This thereby enables a user to be made aware that a lead vehicle is being detected while avoiding display in a range outside the set display region 78 from becoming complicated.

Moreover in the present exemplary embodiment, the display control section 72 displays a subject to be displayed as the second display (the element 84 in the present exemplary embodiment) in the same color as the following mark 92. This thereby enables a user to be made intuitively aware that the subject (the element 84) being displayed as the second display indicates that a lead vehicle is being detected. In cases in which the display position of the following mark 92 corresponding to the lead vehicle image 90 has returned from being outside the set display region 78 to being inside the set display region 78, the following mark 92 is displayed in the same color as the subject (the element 84) being displayed as the second display, resulting in a smooth representation and suppressing an unsettling feeling from being imparted to the user.

Moreover, in the present exemplary embodiment the display control section 72 flashing-displays the subject (the element 84) to be displayed as the second display. This means that the subject (the element 84) to be displayed as the second display can be made to stand out more, enabling improved visibility of the subject (the element 84) to be displayed as the second display.

Moreover, in the present exemplary embodiment the display device is the AR-HUD 56. This thereby enables a feeling of insecurity to be suppressed from being imparted to a user when a following mark is unable to be displayed on the AR-HUD 56.

Note that although in the present exemplary embodiment a mode to perform emphasize-display of the element 84 has been described in which the element 84 indicating the upper edge of the meter display section 80 is flashing-displayed in the same color as the following mark 92 when the display position of the following mark 92 falls outside the set display region 78, the present disclosure is not limited thereto. For example as emphasize-display of the element 84, the element 84 may be displayed in the same color as the following mark 92 and at a constant brightness, or the element 84 may be flashing-displayed in a different color to the following mark 92.

Figure 7:
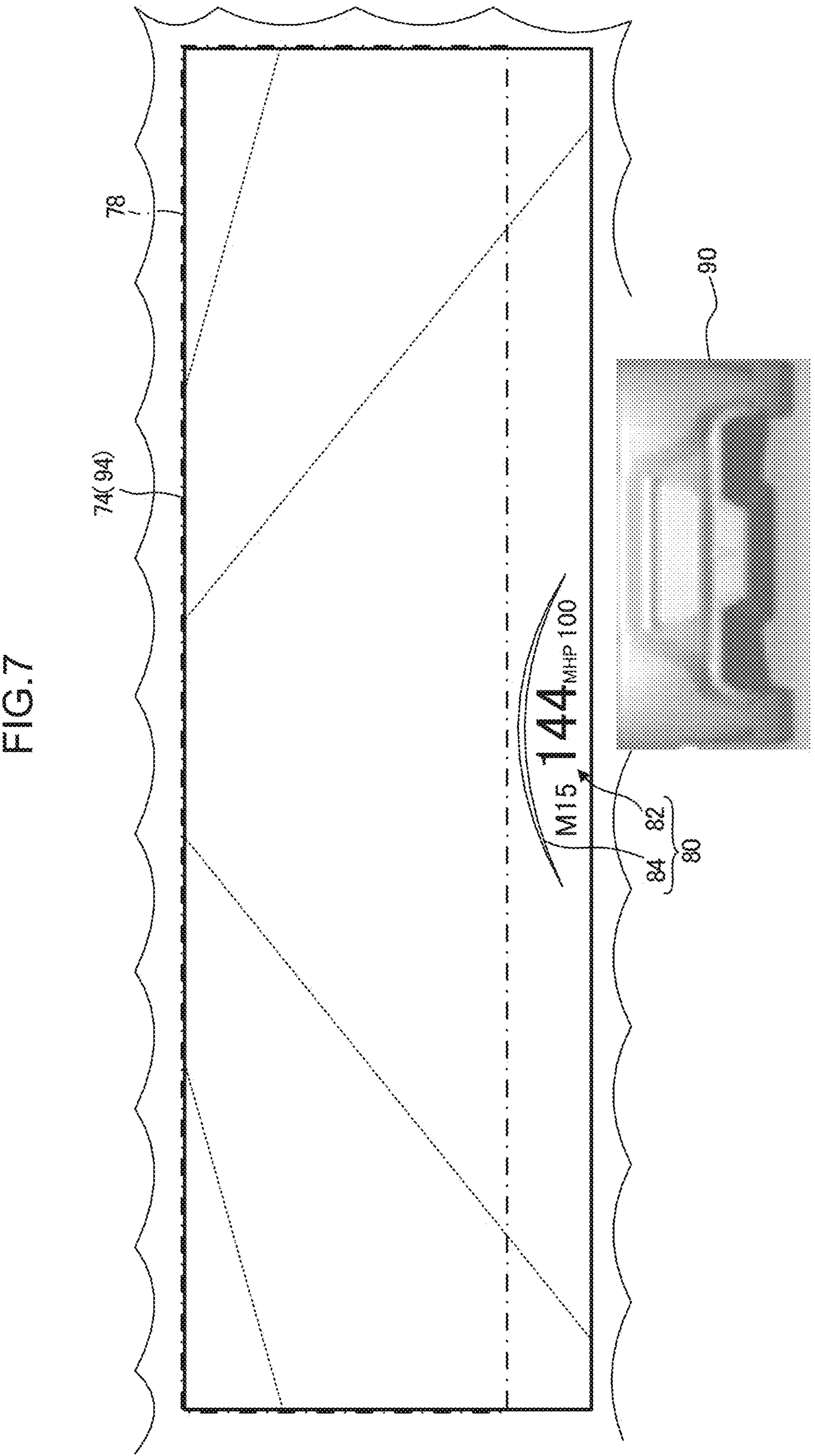
FIG. 7 is a concept diagram illustrating an example of a display on an AR-HUD.

Moreover, although in the exemplary embodiment described above a mode has been described in which emphasize-display of the element 84 indicating the upper edge of the meter display section 80 is performed when the display position of the following mark 92 falls outside the set display region 78, the present disclosure is not limited thereto. For example, a configuration may be adopted in which emphasize-display is performed for the entire meter display section 80 as the subject (for example display thereof in the same color, or flashing-display, or both). The user can be made aware that a lead vehicle is being detected in such cases too, while avoiding display of a range outside the set display region 78 from becoming complicated. Moreover, emphasize-display may be performed for example with a frame 94 indicating an outer edge of the display area 74 as the subject (see FIG. 7). In such cases, a user can be made aware that a lead vehicle is being detected while avoiding display of a range within the display area 74 from becoming complicated.

Figure 8:
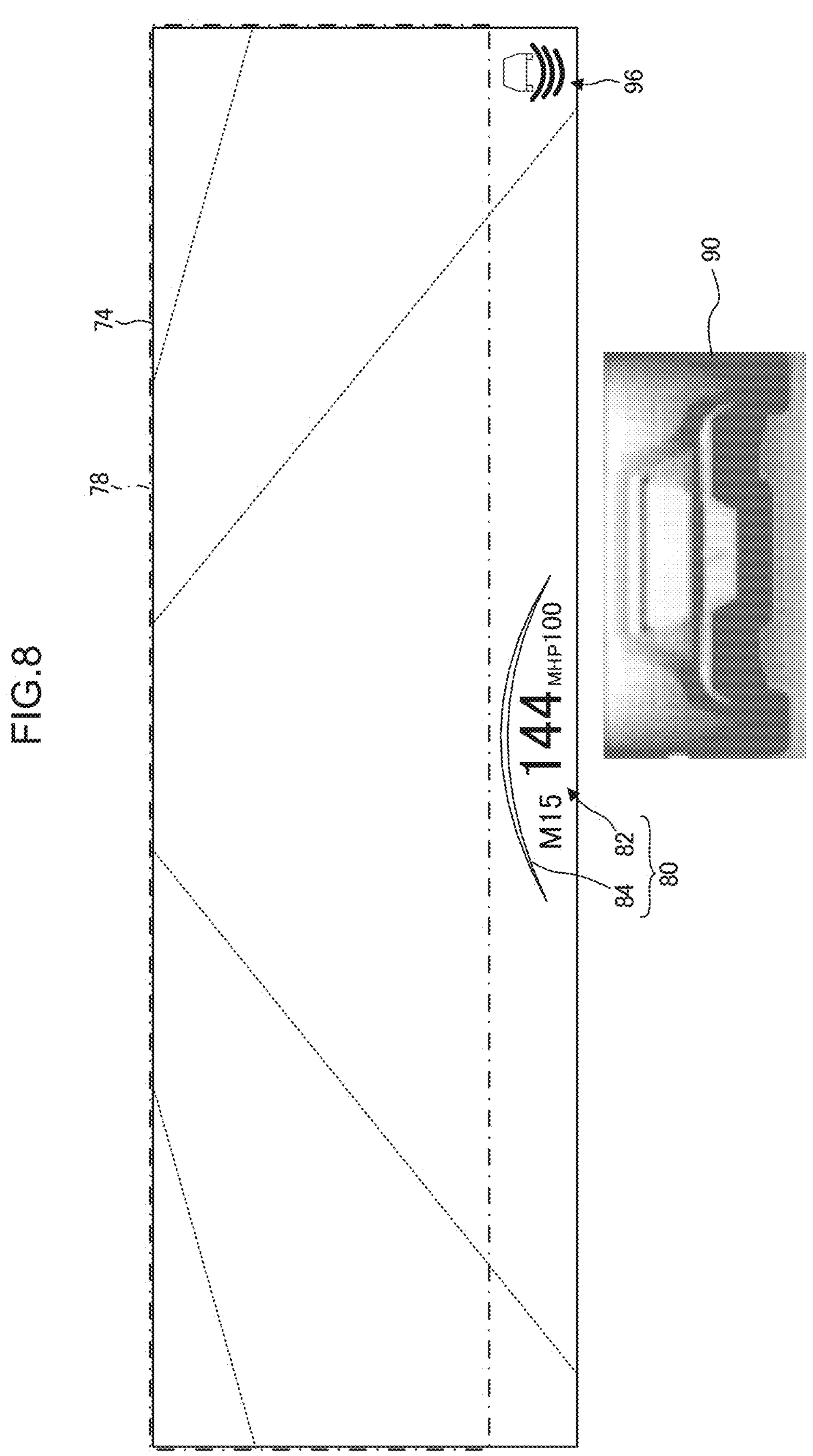
FIG. 8 is a concept diagram illustrating an example of a display on an AR-HUD.

Moreover, although in the exemplary embodiment described above a mode has been described in which the emphasize-display of a subject already being displayed (for example the element 84) is performed as the second display in cases in which the display position of the following mark 92 falls outside the set display region 78, the present disclosure is not limited thereto. For example, a specific icon to indicate that a lead vehicle is being detected (represented as an example by the icon 96 in FIG. 8) when the display position of the following mark 92 falls outside the set display region 78 may be displayed so as to fall outside the set display region 78. In such cases a user can be made intuitively aware that a lead vehicle is being detected.

Furthermore, although in the exemplary embodiment described above a mode has been described in which the AR-HUD 56 is employed as the display device of the present disclosure, the present disclosure is not limited thereto, and the display device of the present disclosure may, for example, be the meter display 68, or may be a display such as one disposed at a central section of an instrument panel. Although in the AR-HUD 56 the lead vehicle image 90 is visible to the user through the windshield, in a display device such as the meter display 68 an image imitating a lead vehicle may also be displayed on the display device. Such modes are included in the scope of rights of the present disclosure.

Moreover, although a mode has been described in which the display control program 54 according to the present disclosure is pre-stored (installed) on the storage section 48 as described above, the display control program according to the present disclosure may be provided in a format recorded on a non-transitory recording medium such as an HDD, SSD, digital versatile disc (DVD), universal serial bus (USB) memory, or the like.

In relation to the exemplary embodiment described above, the following supplements are also disclosed.

Supplement 1

A display control device including a display control section that performs first display in cases in which a display position of a following mark corresponding to a lead vehicle detected by a lead vehicle detection section for detecting lead vehicles is within a set display region set in advance in a display area of a display device by displaying the following mark at the display position, and performs second display to indicate that the lead vehicle is being detected in cases in which the display position falls outside the set display region.

Supplement 2

The display control device of Supplement 1, wherein the display position of the following mark is a position either overlapping with or adjacent to the lead vehicle.

Supplement 3

The display control device of Supplement 1 or Supplement 2, wherein the set display region is a region resulting from removal from the display area of a meter display region where at least a meter display section is displayed at a lower side of the display area in a vehicle height direction.

Supplement 4

The display control device of any one of Supplement 1 to Supplement 3, wherein as the second display the display control section performs display to change display outside the set display region.

Supplement 5

The display control device of any one of Supplement 1 to Supplement 3 wherein as the second display the display control section performs display to emphasize-display a meter display section displayed outside the set display region.

Supplement 6

The display control device of any one of Supplement 1 to Supplement 3, wherein as the second display the display control section performs display to emphasize-display an element of a meter display section indicating an upper edge of the meter display section displayed outside the set display region.

Supplement 7

The display control device of any one of Supplement 1 to Supplement 3, wherein as the second display the display control section performs display to emphasize-display a frame indicating an outer edge of the display area.

Supplement 8

The display control device of any one of Supplement 1 to Supplement 3, wherein as the second display the display control section performs display to display a specific icon indicating that the lead vehicle is being detected by display outside the set display region.

Supplement 9

The display control device of any one of Supplement 5 to Supplement 8, wherein the display control section displays a subject to be displayed as the second display by display in a same color as the following mark.

Supplement 10

The display control device of any one of Supplement 5 to Supplement 8, wherein the display control section displays a subject to be displayed as the second display by flashing-display.

Supplement 11

The display control device of any one of Supplement 1 to Supplement 10, wherein the display device is a head-up display.

Supplement 12

A display control method that causes processing to be executed by a computer. The processing includes performing first display in cases in which a display position of a following mark corresponding to a lead vehicle detected by a lead vehicle detection section for detecting lead vehicles is within a set display region set in advance in a display area of a display device by displaying the following mark at the display position, and performing second display to indicate that the lead vehicle is being detected in cases in which the display position falls outside the set display region.

Supplement 13

The display control method of Supplement 12, wherein the display position of the following mark is a position either overlapping with or adjacent to the lead vehicle.

Supplement 14

The display control method of Supplement 12 or Supplement 13, wherein the set display region is a region resulting from removal from the display area of a meter display region where at least a meter display section is displayed at a lower side of the display area in a vehicle height direction.

Supplement 15

The display control method of any one of Supplement 12 to Supplement 14, wherein as the second display, display is performed to change display outside the set display region.

Supplement 16

The display control method of any one of Supplement 12 to Supplement 14, wherein as the second display, display is performed to emphasize-display the meter display section displayed outside the set display region.

Supplement 17

The display control method of any one of Supplement 12 to Supplement 14, wherein as the second display, display is performed to emphasize-display an element of a meter display section indicating an upper edge of the meter display section displayed outside the set display region.

Supplement 18

The display control method of any one of Supplement 12 to Supplement 14, wherein as the second display, display is performed to emphasize-display a frame indicating an outer edge of the display area.

Supplement 19

The display control method of any one of Supplement 12 to Supplement 14, wherein as the second display, display is performed to display a specific icon indicating that the lead vehicle is being detected by display outside the set display region.

Supplement 20

The display control method of any one of Supplement 16 to Supplement 19, wherein a subject to be displayed as the second display is displayed in a same color as the following mark.

Supplement 21

The display control method of any one of Supplement 16 to Supplement 19, wherein a subject to be displayed as the second display is displayed by flashing-display.

Supplement 22

The display control method of any one of Supplement 12 to Supplement 21, wherein the display device is a head-up display.

Supplement 23

A display control program that causes processing to be executed by a computer. The processing includes performing first display in cases in which a display position of a following mark corresponding to a lead vehicle detected by a lead vehicle detection section for detecting lead vehicles is within a set display region set in advance in a display area of a display device by displaying the following mark at the display position, and performing second display to indicate that the lead vehicle is being detected in cases in which the display position falls outside the set display region.

Supplement 24

The display control program of Supplement 23, wherein the display position of the following mark is a position either overlapping with or adjacent to the lead vehicle.

Supplement 25

The display control program of Supplement 23 or Supplement 24, wherein the set display region is a region resulting from removal from the display area of a meter display region where at least a meter display section is displayed at a lower side of the display area in a vehicle height direction.

Supplement 26

The display control program of any one of Supplement 23 to Supplement 25, wherein as the second display, display is performed to change display outside the set display region.

Supplement 27

The display control program of any one of Supplement 23 to Supplement 25, wherein as the second display, display is performed to emphasize-display the meter display section displayed outside the set display region.

Supplement 28

The display control program of any one of Supplement 23 to Supplement 25, wherein as the second display, display is performed to emphasize-display an element of a meter display section indicating an upper edge of the meter display section displayed outside the set display region.

Supplement 29

The display control program of any one of Supplement 23 to Supplement 25, wherein as the second display, display is performed to emphasize-display a frame indicating an outer edge of the display area.

Supplement 30

The display control program of any one of Supplement 23 to Supplement 25, wherein as the second display, display is performed to display a specific icon indicating that the lead vehicle is being detected by display outside the set display region.

Supplement 31

The display control program of any one of Supplement 27 to Supplement 30, wherein a subject to be displayed as the second display is displayed in a same color as the following mark.

Supplement 32

The display control program of any one of Supplement 27 to Supplement 30, wherein a subject to be displayed as the second display is displayed by flashing-display.

Supplement 33

The display control program of any one of Supplement 23 to Supplement 32, wherein the display device is a head-up display.

What is claimed is:

1. A display control device comprising:

a memory; and a processor coupled to the memory and configured to:

display a meter on a lower portion of a display area of an augmented reality heads up display (AR-HUD);

determine a first distance from an ego vehicle to a lead vehicle that the ego vehicle is following while performing adaptive cruise control;

determine whether a mark is able to be displayed within the display area of the AR-HUD so as to be displayed adjacent to an image of the lead vehicle in the AR-HUD;

upon determination that the mark is able to be displayed within the display area of the AR-HUD so as to be displayed adjacent to the image of the lead vehicle in the AR-HUD, display the mark adjacent to the image of the lead vehicle in the AR-HUD in a first color; and upon determination that the mark is not able to be displayed within the display area of the AR-HUD so as to be displayed adjacent to the image of the lead vehicle in the AR-HUD, flashing-display the meter in the first color.

2. The display control device of claim 1, wherein the processor is configured to, upon determination that the mark is able to be displayed within the display area of the AR-HUD so as to be displayed adjacent to the image of the lead vehicle in the AR-HUD, display the mark in a region resulting from removal from the display area of a meter display region where at least a meter display section is displayed at a lower side of the display area in a vehicle height direction.

3. The display control device of claim 1, wherein the processor is configured to emphasize-display an element of a meter display section indicating an upper edge of the meter display section displayed outside the display area of the AR-HUD.

4. The display control device of claim 1, wherein the processor is configured to emphasize-display a frame indicating an outer edge of the display area of the AR-HUD.

5. The display control device of claim 1, wherein the processor is configured to perform display to display a specific icon indicating that the lead vehicle is being detected by display outside the display area of the AR-HUD.

6. A display control method that is performed by a computer, the method comprising:

displaying a meter on a lower portion of a display area of an augmented reality heads up display (AR-HUD);

determining a first distance from an ego vehicle to a lead vehicle that the ego vehicle is following while performing adaptive cruise control;

determining whether a mark is able to be displayed within the display area of the AR-HUD so as to be displayed adjacent to an image of the lead vehicle in the AR-HUD;

upon determination that the mark is able to be displayed within the display area of the AR-HUD so as to be displayed adjacent to the image of the lead vehicle in the AR-HUD, displaying the mark adjacent to the image of the lead vehicle in the AR-HUD in a first color; and upon determination that the mark is not able to be displayed within the display area of the AR-HUD so as to be displayed adjacent to the image of the lead vehicle in the AR-HUD, flashing-displaying the meter in the first color.

7. A non-transitory storage medium storing a program that causes a computer to execute display control processing, the display control processing comprising:

displaying a meter on a lower portion of a display area of an augmented reality heads up display (AR-HUD);

determining a first distance from an ego vehicle to a lead vehicle that the ego vehicle is following while performing adaptive cruise control;

determining whether a mark is able to be displayed within the display area of the AR-HUD so as to be displayed adjacent to an image of the lead vehicle in the AR-HUD;

upon determination that the mark is able to be displayed within the display area of the AR-HUD so as to be displayed adjacent to the image of the lead vehicle in the AR-HUD, displaying the mark adjacent to the image of the lead vehicle in the AR-HUD in a first color; and upon determination that the mark is not able to be displayed within the display area of the AR-HUD so as to be displayed adjacent to the image of the lead vehicle in the AR-HUD, flashing-displaying the meter in the first color.

* * * * *